(12) United States Patent
Kurakake et al.

(10) Patent No.: US 6,324,443 B1
(45) Date of Patent: Nov. 27, 2001

(54) ROBOT CONTROL APPARATUS

(75) Inventors: Mitsuo Kurakake, Tokyo; Atsushi Watanabe, Minamitsuru-gun; Yoshiki Hashimoto, Hadano; Tomoyuki Terada, Minamitsuru-gun, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/258,078

(22) Filed: Feb. 26, 1999

(30) Foreign Application Priority Data

Feb. 26, 1998 (JP) .................................................. 10-062218

(51) Int. Cl.[7] ...................................................... G06F 19/00
(52) U.S. Cl. .......................... 700/245; 700/247; 700/249; 709/1; 318/568.24; 710/260; 345/440
(58) Field of Search .................................... 700/245, 247, 700/249, 95, 86, 257, 259, 260, 251, 253, 186; 709/1; 318/568.24, 568.1, 573, 568.13; 710/260, 63; 345/440; 701/23

(56) References Cited

U.S. PATENT DOCUMENTS

| | | | |
|---|---|---|---|
| 4,835,730 | * 5/1989 | Shimano et al. | 700/257 |
| 4,912,650 | * 3/1990 | Tanaka et al. | 700/264 |
| 5,038,089 | * 8/1991 | Szakaly | 701/23 |
| 5,051,676 | * 9/1991 | Seki et al. | 318/568.24 |
| 5,379,382 | * 1/1995 | Work et al. | 710/63 |
| 5,555,179 | * 9/1996 | Koyama et al. | 700/95 |
| 5,841,959 | * 11/1998 | Guiremand | 345/440 |
| 6,031,973 | * 2/2000 | Gomi et al. | 700/245 |
| 6,134,102 | * 10/2000 | Wörn et al. | 361/680 |

FOREIGN PATENT DOCUMENTS

| | | |
|---|---|---|
| 0792726 A1 | 9/1997 | (EP) . |
| 0852346 A1 | 7/1998 | (EP) . |
| 2177521 A | 1/1987 | (GB) . |
| 1-111208 | 4/1989 | (JP) . |
| 4-111093U | 9/1992 | (JP) . |
| 5-173626 | 7/1993 | (JP) . |
| 8-166814 | 6/1996 | (JP) . |
| 8-297509 | 11/1996 | (JP) . |
| 9-76182 | 3/1997 | (JP) . |
| 10-146782 | 6/1998 | (JP) . |
| WO 97/04369 | 2/1997 | (WO) . |
| WO 97/11416 | 3/1997 | (WO) . |

OTHER PUBLICATIONS

White et al., A Graphics Simulator for a Robotic Arm, IEEE., pp. 417–429, 1989.*
Simon et al., Computer–Aided Design of a Generic Robot Controller Hndling Reactivity and Real–Time Control Issues, IEEE., pp. 213–229, 1993.*
Troncy et al., Modular Robots—Graphicl Interactive Programming, IEEE., pp. 1739–1742, 1988.*
Pires et al., Running an Industrial Robot from a typical Personal Computer, IEEE., pp. 267–270, 1998.*
Hong et al., Six–Joints Industrial Robot Controller Software System, IEEE., pp. 182–185, 1993.*

(List continued on next page.)

Primary Examiner—William A. Cuchlinski, Jr.
Assistant Examiner—McDieunel Marc
(74) Attorney, Agent, or Firm—Staas & Halsey LLP

(57) ABSTRACT

An robot control apparatus with a teaching operation panel capable of making graphic display. The teaching operation panel comprises a processor, a flash memory, a DRAM, a communication port, a touch panel, a graphic controller for controlling a display device, a key control circuit for jog keys. The flash memory stores an operating system having small data size storable in the flash memory and supporting a graphic interface. The processor reads a robot operation program stored in a memory of the robot controller or in an external memory of the teaching operation pane and makes a graphic display on the display device. The graphic display is easily comprehended by an operator and editing and creation of the robot control program is made easy.

7 Claims, 12 Drawing Sheets

OTHER PUBLICATIONS

Ingimarson et al., A Multiprocessor Based Robot Controlled—A Chimera II Application, IEEE., pp. 1081–1084, 1993.*

West et al., Forth–83 Controller For A Pick–And–Place Robot, IEEE., pp. 129–133, 1989.*

Tzen et al, Issues on the Architecture and the Design of Distributed Shared Memory Systems, IEEE., pp. 60–61, 1996.*

Brantmark, Man/Machine Communication in ASEA's New Robot Controller, ASEA Journal, pp. 145–150, 1982.*

* cited by examiner

ROBOT CONTROL APPARATUS

BACKGROUND OF THE INVENTION

1. Field of the Invention

The present invention relates to a robot control apparatus for controlling a robot, and in particular to an operation control panel of the robot control apparatus.

2. Description of the Related Art

A robot control apparatus is constituted by a robot controller for drivingly controlling a robot and a teaching operation panel for driving the robot by manual input command and for teaching operations of the robot to the robot controller. The teaching operation panel is made portable and connected to the robot controller by a cable or other means.

Since the teaching operation panel is handled by an operator, it is preferable that the number of hardware means equipped with the teaching operation panel is small and the hardware means are light-weighted. From the other aspect, as the teaching operation panel is used for teaching control data to the robot controller, teaching operation would be facilitated if teaching points are graphically displayed in a diagram.

According to a teaching operation panel described in Japanese Patent Publication No. 8-166814, the graphic display is made possible on a display device provided on the teaching operation panel so as to achieve the above mentioned requirement.

FIG. 14 is a schematic block diagram of a robot controller and a teaching operation panel known from Japanese Patent Publication No. 8-166814. A robot controller 50 is provided with a personal computer 60 and a graphic display can be made on a display device 71 of a teaching operation panel 70 under the control of the personal computer 60.

In FIG. 14, numeral 51 designates a control unit for controlling a robot main body and the control unit 51 and the personal computer 60 are connected by a bus. The personal computer 60 comprises a processor 63, a bus interface 61 for connection with the control unit 51, a VGA (Video Graphics Adaptor) 62 connected to the display device 71 in the teaching operation panel 70 and an interface 66 connected to input means 73 such as a keyboard in the teaching operation panel 70 which are mounted a base board, as well as a hard disk 64 connected to the card PC and a floppy disk 65.

The teaching operation panel 70 comprises the display device, the input means 73 such a keyboard and an emergency key 72. An operational signal thereof is transmitted to the control unit 51 via the personal computer 60 by operating the input means 73 to thereby operate the robot and teach a robot operation program. Further, in graphically displaying taught points of the taught operation program, the personal computer 60 analyzes robot control data, converts it into graphic data and makes graphic display on the display device of the teaching operation panel 70.

Thus, according to the conventional robot control apparatus, the personal computer is necessary for making a graphic display on the display device of the teaching operation panel. Further, the personal computer requires the hard disk and the floppy disk for making graphic display.

If the personal computer is provided at the teaching operation panel in order to display graphics in the teaching operation panel, the teaching operation panel becomes heavy and operational performance is deteriorated. Further, the hard disk is weak at shock and if it is disposed in the teaching operation panel, reliability is deteriorated. Further, there is a problem that the processor for the personal computer generates significant heat and is not suitable for installing in the teaching operation panel. Accordingly, in the prior art, as described above, the personal computer is provided in the robot controller.

SUMMARY OF THE INVENTION

It is an object of the invention to provide a robot control apparatus with a teaching operation panel capable of displaying graphics without using a separately provided personal computer.

A robot control apparatus of the present invention comprises: a robot controller; and a portable teaching operation panel having a display device, a data input device, a microprocessor, a semiconductor memory, an operating system stored in said semiconductor memory and operable on said semiconductor memory. The microprocessor operates by the operating system to make a graphic display on the display device based on data inputted through the data input device.

The operating system includes a creating/editing program for creating or editing robot control data and the microprocessor makes a graphic display on the display device based on the robot control data created or edited by the creating/editing program.

According to another aspect of the present invention, the portable teaching operation panel further comprises a control data storage memory for storing the robot control data created or edited by the creating/editing program. The control data storage memory is connected with the external memory to input and output data through data interface. The robot control data to be edited is inputted from the external memory, and the robot control data created or edited is sent from the control data storage memory to the external memory. Further, the robot control data created or edited is sent to a memory in the robot controller from the control data storage memory. Also, the robot control data stored in the memory of the robot controller may be sent to the teaching operation panel and stored in the control data storage memory.

With the above architecture, since taught points and/or various parameters are graphically displayed, an operator can grasp contents of the operation program easily and explicitly.

DETAILED DESCRIPTION OF THE PREFERRED EMBODIMENTS

Figure 1:
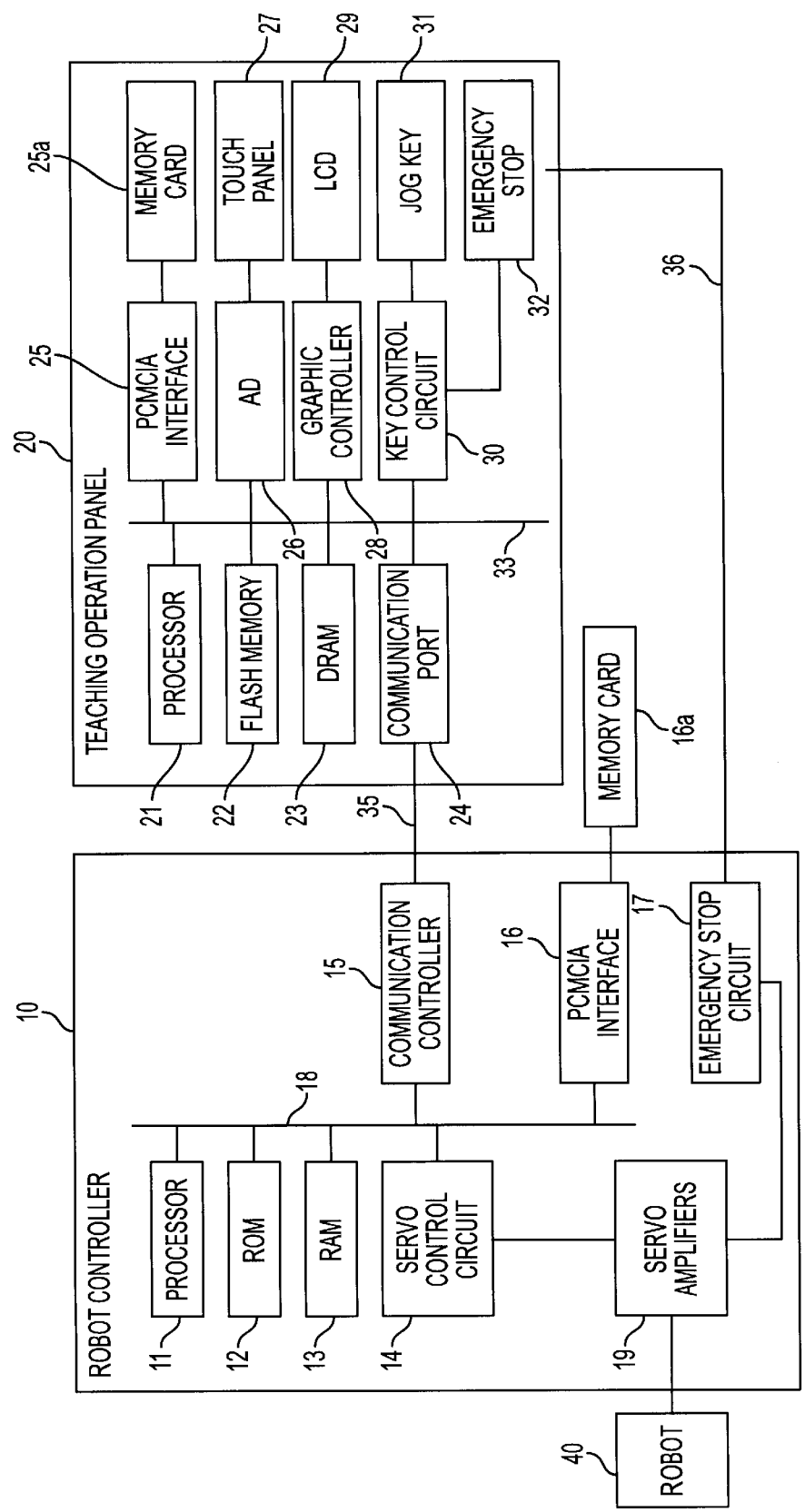
FIG. 1 is a block diagram of a robot control apparatus according to an embodiment of the invention.

FIG. 1 is a block diagram of essential portions of an embodiment according to the invention. A robot control system for controlling a robot 40 is constituted by a robot controller 10 and a teaching operation panel 20 and the robot controller 10 and the teaching operation panel 20 are connected by a cable 35 and a signal line 36.

According to the robot controller 10, a processor 11 for controlling a total of the robot controller 10, ROM 12 for storing a system program for operating the processor 11, RAM 13 for storing a teaching operation program or various parameters which is utilized for temporarily storing data in a calculation processing, a servo control circuit 14 for controlling drive of servo motors for respective shafts of the robot 40, a communication controller 15 for controlling communication with the teaching operation panel 20 and a PCMCIA (Personal Computer Memory Card International Association) interface 16 for connecting a memory card 16a, are connected by a bus 18.

The servo control circuit 14 is connected with servo amplifiers 19 of the respective shafts and the servo amplifiers 19 are connected with the servo motors of the respective shafts of the robot 40. Further, the respective servo amplifiers 19 and an emergency stop circuit 17 are connected and as mentioned later, when an emergency stop signal is transmitted from the manual operation panel 20, power supply to the servo amplifiers 19 is made OFF and robot operation is stopped. Further, the PCMCIA interface 16 is for reading information from a memory card 16a and the processor 11 reads information of an operation program of the robot stored in the memory card via the PCMCIA interface 16 and stores it in RAM 13.

The communication controller 15 is connected with the teaching operation panel 20 via the cable 35 and the robot controller receives commands or data from the teaching operation panel 20 and transmits data from the robot controller 10 and the robot control data, mentioned later, to the teaching operation panel 20.

Further, the processor 11 reads robot control data stored in RAM 13, outputs motion commands to the servo control circuit based on the teaching operation program when the command is the motion command of the robot and the servo control circuit carries out a feedback control of position, velocity or current to thereby drive the servo amplifiers 19 and the robot is controlled to operate by controlling to drive the servo motors of the respective shafts of the robot by driving the servo amplifiers 19.

In the teaching operation panel 20, there are provided a processor 21, a flash memory 22, DRAM 23, a communication port 24, a PCMCIA interface 25, an AD (analog to digital) converter 26 connected with a touch panel 27, a graphic controller 28 connected with a liquid crystal display device (LCD) 29 and a key control circuit 30 connected with a jog key 31 and an emergency stop key 32, all being connected by a bus 33.

The flash memory 22 stores an operating system program for the processor 21. Particularly, as a feature of the invention, the flash memory 22 stores an operating system program supporting a graphic user interface and having a data size storable in a semiconductor memory which has storage capacity smaller than that of a hard disk and operable on the semiconductor memory. Such operating system is exemplified by "Windows CE (trademark)". With such operating system, data of a robot operation program or parameters is converted into visual diagrams or graphic display data and displayed in the liquid crystal display device 29. As the semiconductor memory for storing the operating system program for the processor 21, a nonvolatile memory such as a ROM or a bubble memory other than the flash memory may be used.

DRAM 23 is used as a working memory for temporarily storing data for a calculation processing. Further, as mentioned later, a capacity of DRAM 23 is set to be large when control data of the robot is formed by the teaching operation panel per se or an operation program or parameters stored in RAM 13 of the robot controller 10 are read and the control data or parameters are stored to modify the control data. The capacity of DRAM 23 is small when parameters or robot control data are not stored in this way.

The communication port 24 connects the robot controller 10 and the teaching operation panel 20 and is connected to the communication controller 15 of the robot controller 10 via the cable 35 to thereby carry out serial communication.

The PCMCIA interface 25 is for reading a robot operation program or data of various parameters stored in a memory card 25a and writing an operation program or various parameters for storing to DRAM 23 to the memory card 25a.

The touch panel 27 is arranged to overlap the liquid crystal display device 29 so as to enable input of a command of a displayed item by touching and pressing a region of the item displayed on the liquid crystal display device 29 and this arrangement is the same as that of a conventional touch panel.

The key control circuit 30 is constituted by a processor or DMAC (Direct Memory Access Controller) for processing a signal from the jog key 31 or the emergency stop key. Further, the processor 21 may directly carry out the key processing. Further, although the key control circuit 30 is connected to the bus 33 according to the embodiment shown by FIG. 1, the circuit may not be connected to the bus 33 and may be independent therefrom and the robot controller may receive an output from the key control circuit via a cable.

As mentioned above, the teaching operation panel 20 according to the invention can display robot control data or parameters by diagrams or graphics by an equipment comprising only light-weighted electronic parts without installing with a heavy-weighted device such as a hard disk and there can be provided a light-weighted and highly functional teaching operation panel.

Next, an explanation will be given of operation of the control system. According to the control system, there are two modes of carrying out the invention. According to a former one, the storage capacity of DRAM 23 is small, robot control data or parameters to be edited or a robot operation program to be formed is not stored to DRAM 23 but the robot operation program is formed and edited by directly making access to RAM 13 of the robot controller 10. According to a latter one, the storage capacity of DRAM 23 is made large, robot control data and parameters to be edited or formed are stored to DRAM 23 and the robot control data is formed and edited. The former mode of a method of forming and editing robot control data by directly making access to RAM 13 of the robot controller is hereinafter referred to as a first embodiment. Further, a method of forming a file of robot control data in DRAM 23 is hereinafter referred to as a second embodiment.

(First Embodiment)

According to the first embodiment, the memory capacity of DRAM 23 in the teaching operation panel 20 is small and is provided with a capacity to a degree capable of being used as a working memory for temporarily storing data in a calculation processing.

Figure 2:
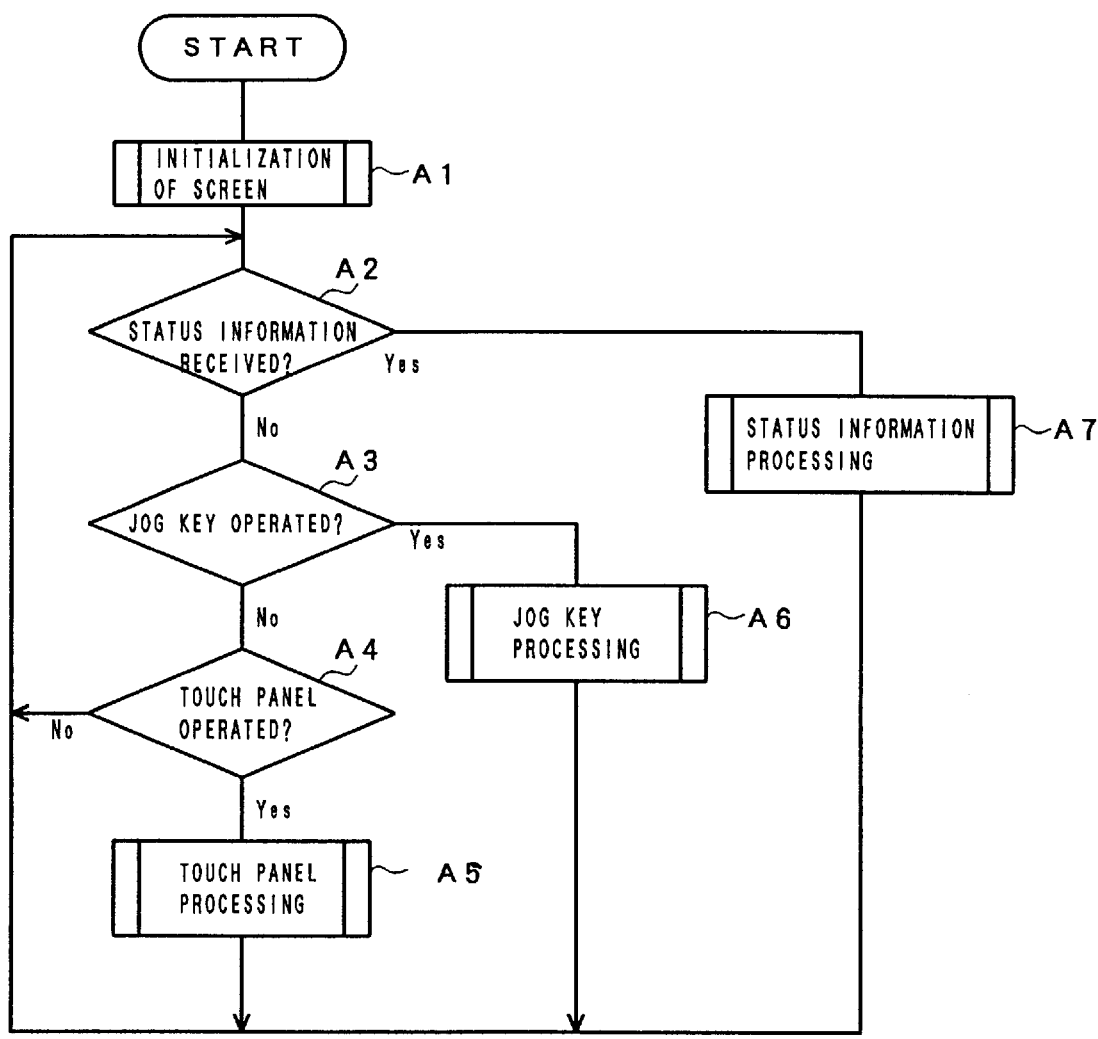
FIG. 2 is a flowchart of a main processing which is carried out by a processor of a teaching operation panel according to the embodiment.
Figure 12:
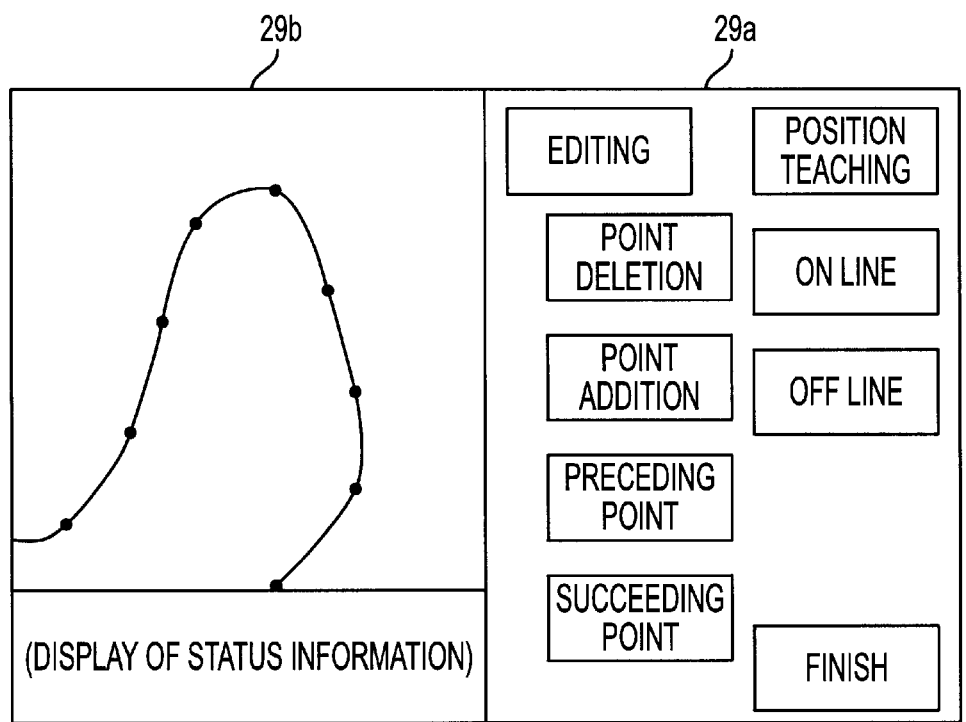
FIG. 12 is an explanatory view of a display screen.

When power is inputted to the robot 40, the robot controller 10 and the teaching operation panel 20, the processor 21 of the teaching operation panel 20 executes a main processing shown by FIG. 2. Further, the processor 11 of the robot controller 10 executes a main processing shown by FIG. 3. As shown by FIG. 2, the processor 21 of the teaching operation panel 20 initializes a display screen of the liquid crystal display device 29 to thereby constitute an initial screen (Operation A1). FIG. 12 shows a frame on the liquid crystal display device 29 which displays a button display area 29a for inputting commands on the touch panel 27, a graphical display area 29b for graphically displaying teaching points of the robot and a status information display area 29c expressing a state of the robot. In the initial screen, nothing is displayed in the graphical display area 29b and the status information display area 29c and in the button display area 29a, only an "editing" button is darkly displayed to effectively function and other buttons are lightly displayed to be invalidated. Further, according to the first embodiment, the teaching operation panel 20 is used by being always connected to the robot controller 20 and is always on line use and therefore, buttons "on line" and "off line" for respectively designating an on line mode and an off line mode are not installed. These buttons are for the second embodiment, mentioned later.

Next, the processor 21 repeatedly determines whether status information is transmitted from the robot controller 10 (Step A2), whether the jog key 31 of the teaching operation panel 20 is operated (Step A3) and whether the touch panel 27 is operated (Step A4). When the status information is transmitted, a status information processing is executed (Step A7) and when the jog key is operated, a processing in correspondence with an operated jog key is executed (Step A6). Further, when the touch panel is operated, a processing inputted from the touch panel is executed (Step A5). Further, when these processings have been finished, the operation returns again to Step A2 and executes repeatedly the above-described processings.

Figure 3:
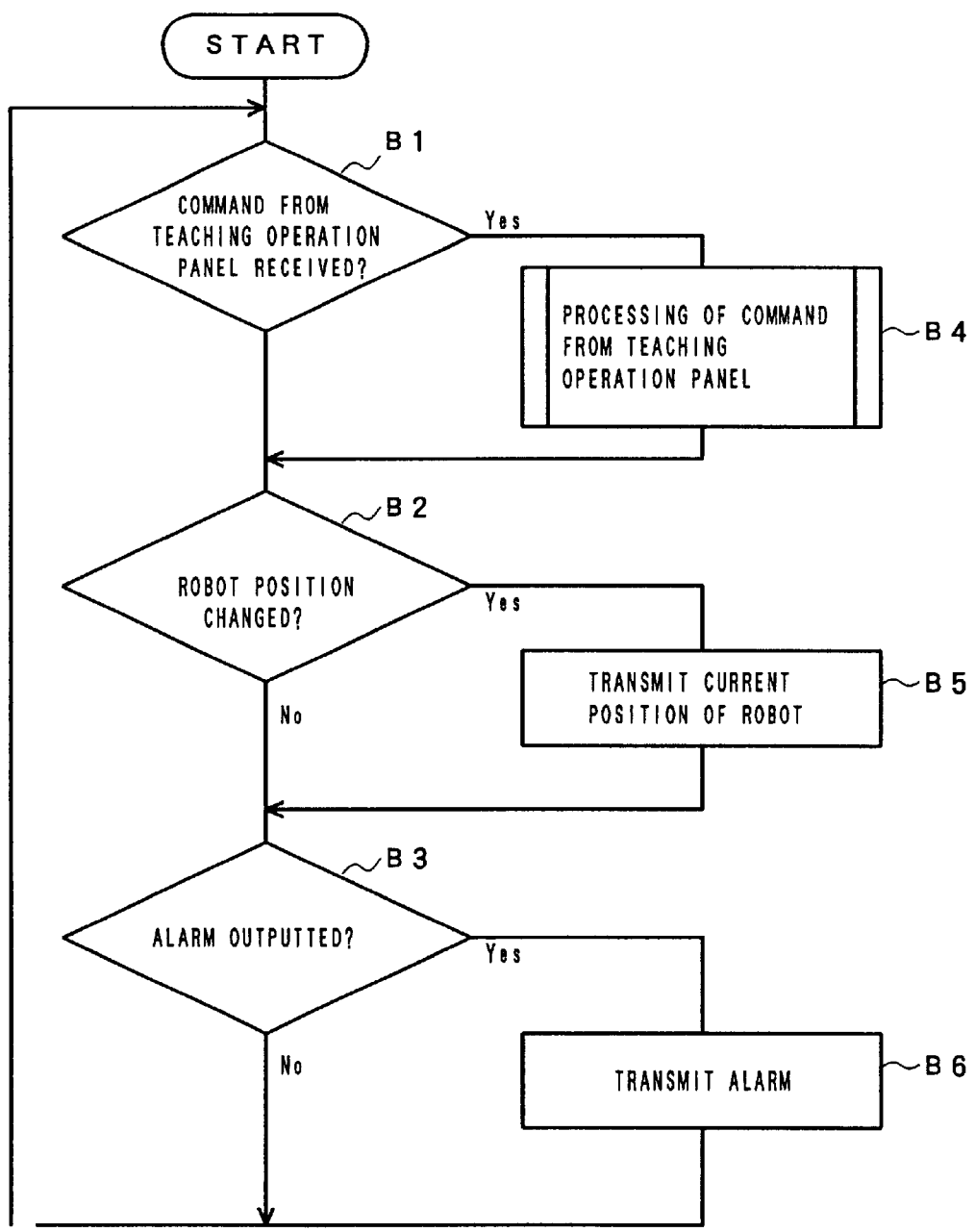
FIG. 3 is a flowchart of the main processing which is carried out by a processor of a robot controller according to the embodiment.

On the other hand, the processor 11 of the robot controller 10 executes processings shown by FIG. 3 and repeatedly determines whether or not a command is inputted from the teaching operation panel 20 (Step B1), whether or not there is a change in robot position and posture (Step B2) and whether or not an alarm is outputted (Step B3). Further, when a command is inputted from the teaching operation panel 20, a processing in accordance with the command is executed (Step B4), when there is a change in a position and a posture of the robot, or when an alarm is generated, a current position of the robot or the alarm is transmitted to the teaching operation panel 20 as status information (Steps B5, B6). Further, when power is inputted, the current position of the robot is transmitted by determining that there is a change in the position and the posture of the robot.

Figure 4:
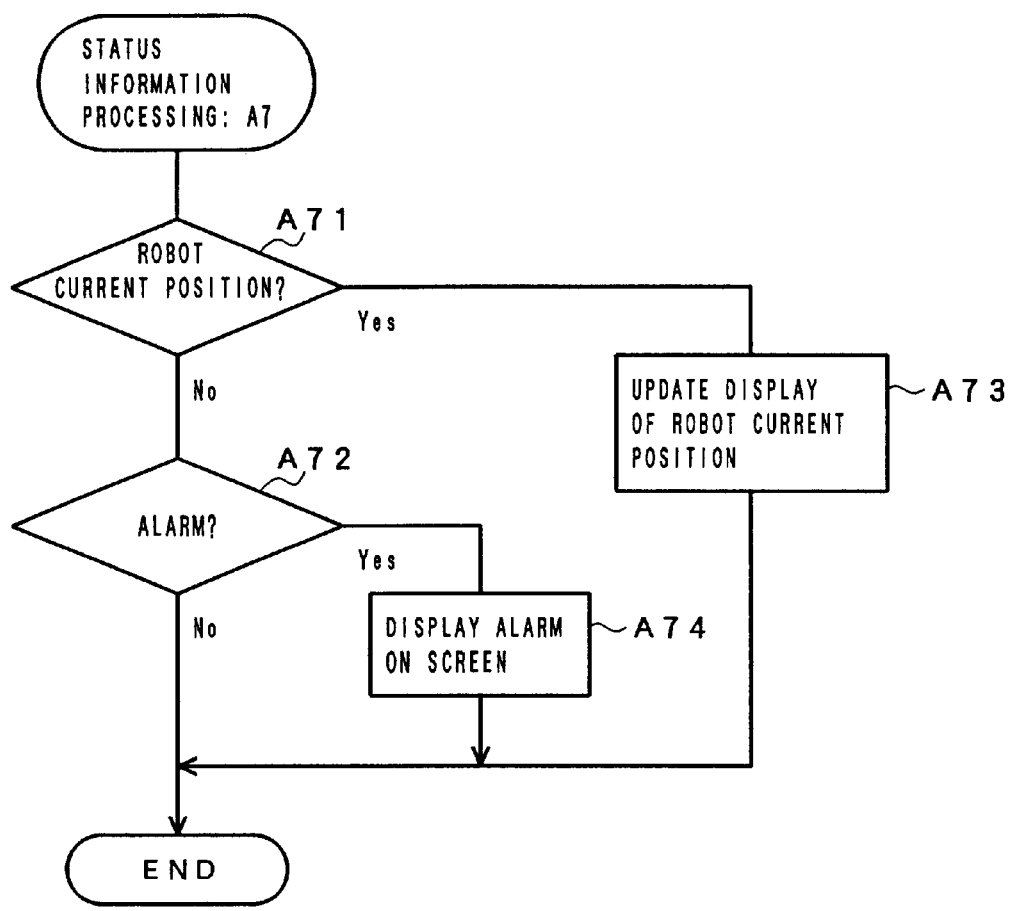
FIG. 4 shows a subroutine of a status information processing according to the embodiment.

Hence, when the current position of the robot is outputted from the robot controller 10 as status information (Step B5), or the alarm is outputted (Step B6), the processor 21 of the teaching operation panel 20 detects this at Step A2 and carries out the status information processing at Step A7 shown as a subroutine in FIG. 4. When received data is information of the current position of the robot (Step A71), the operation updates display of the current position of the robot in the status information display area 29c of the liquid crystal display device 29 shown by FIG. 12 and displays the transmitted information of the current position of the robot (Step A73). Further, when the received data is the alarm information, the operation displays the alarm on the liquid crystal display device 29 (Step A74). Incidentally, the alarm display may be displayed at the status information display area 29c or may be displayed in a large size by using a total of the liquid crystal display area regardless of the status information display area 29c. When status information display processings have been finished in this way, the operation returns to the main processing and processings at Step A2 and later Steps are repeatedly executed.

Figure 5:
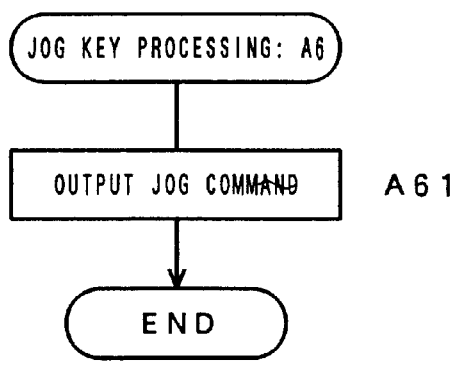
FIG. 5 shows a subroutine of a jog key processing according to the embodiment.

Further, when the jog key is operated (Step A3), the jog key processing (Step A6) shown in FIG. 5 as a subroutine is executed. As shown in a simplified manner in FIG. 5, the jog command includes a rotation command in + or −direction of a rotational angle of a robot joint shaft or a motion command in + or −direction of X, Y or Z axis orthogonal to each other and when the jog key for giving the command is operated, the processor 21 of the teaching operation panel 20 outputs a jog command in accordance with the operated key (Step A61).

Figure 6:
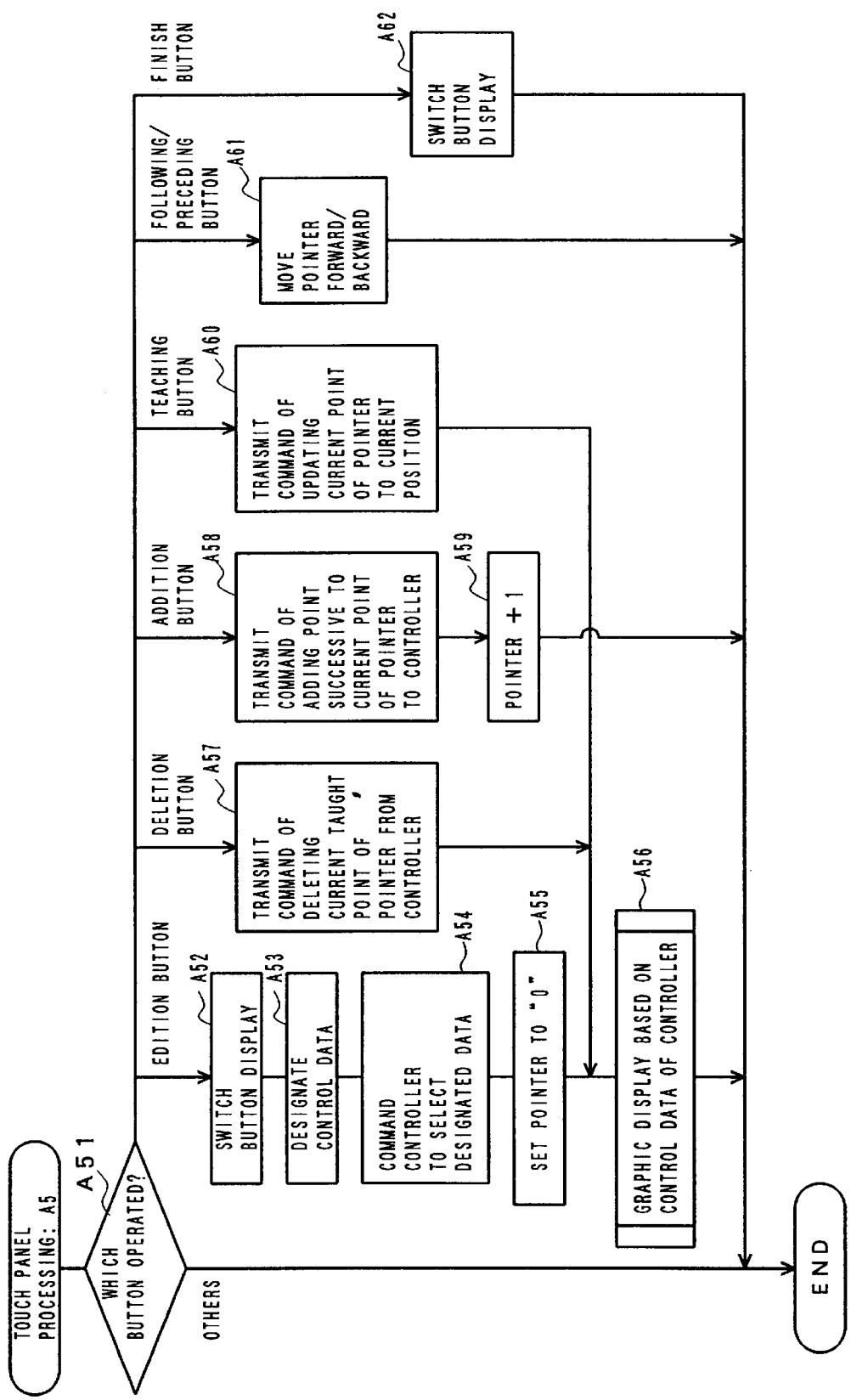
FIG. 6 is a flowchart of a touch panel processing according to a first embodiment.

Further, when the touch panel 27 is operated to press (Step A4), a touch panel processing shown in FIG. 6 as a subroutine is started (Step A5). In an initial screen, only the "editing" button is darkly displayed to be validated and other buttons are invalidated and displayed lightly. Then, when the touch panel 27 is operated, the operation determines which is pressed button (Step A51), as mentioned above, according to the initial screen, only the "editing" button is validated and accordingly, when a button other than the "editing" button is pressed or when a portion other than these buttons is pressed, the touch panel processing does not execute anything and is finished and the operation returns to the main processing.

Figure 13:
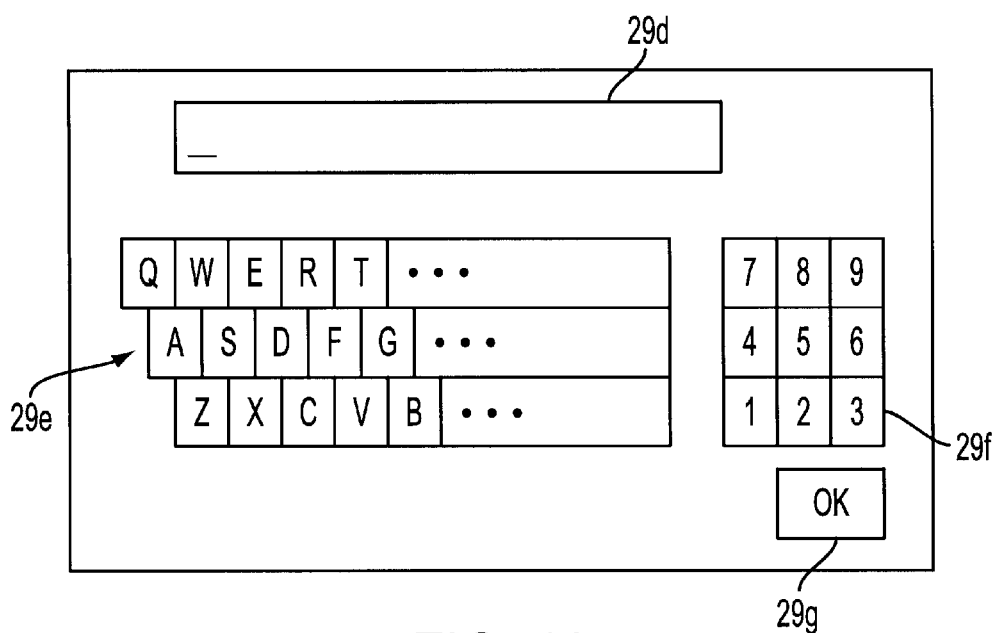
FIG. 13 is an explanatory view of a data input window screen.
Figure 14:
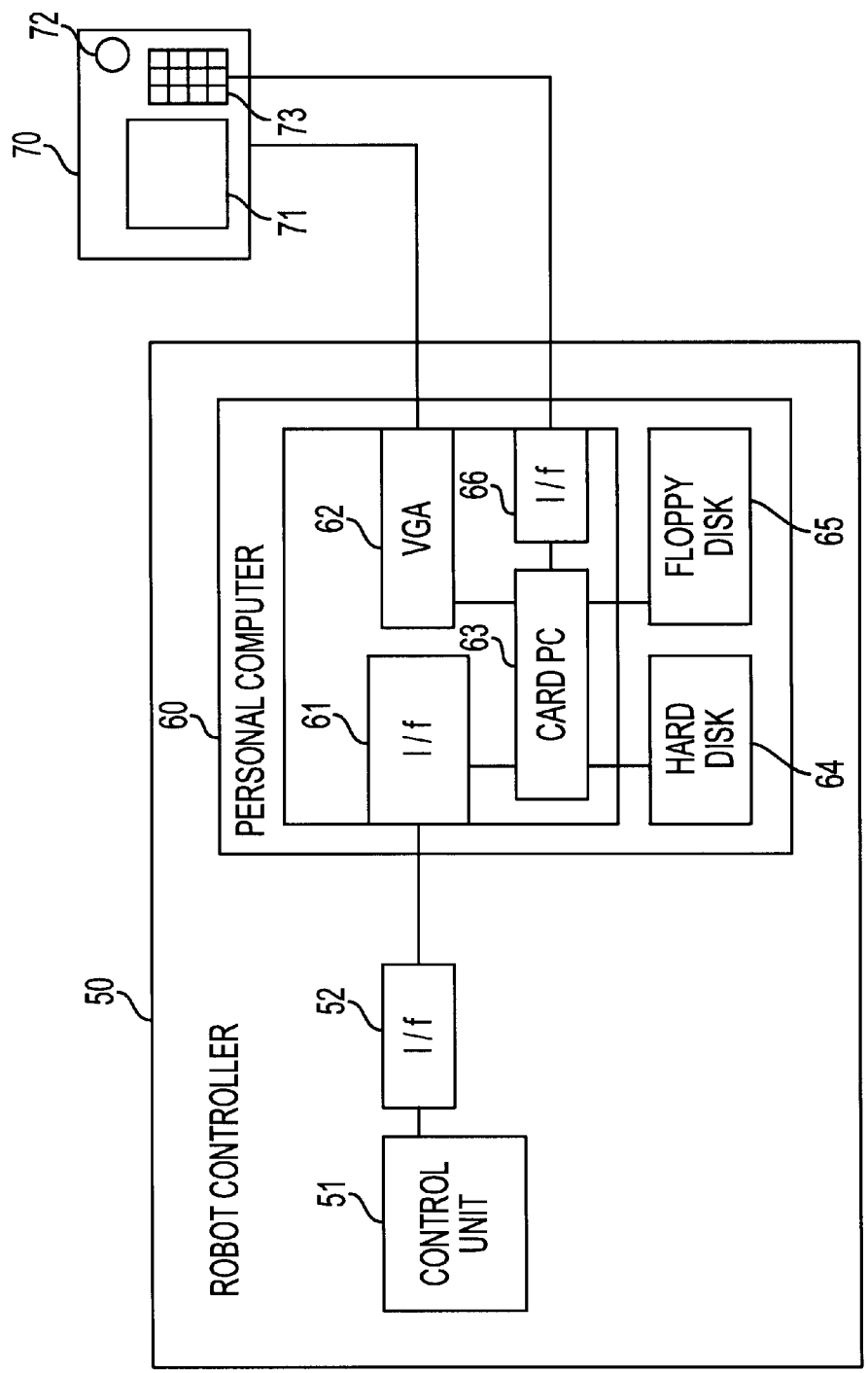
FIG. 14 is a block diagram of a conventional example of a robot control apparatus capable of carrying out a display device graphic display of a teaching operation panel.

When the "editing" button is pressed, the processor 21 switches the display screen of the liquid crystal display device 29, invalidates the "editing" button and lightly displays it and darkly displays to validate respective buttons of "position teaching", "point deletion", "point addition", "preceding point", "succeeding point" and "finish" (Step A52). Further, there is displayed a window screen urging input of (control) data as shown by FIG. 13 which overlaps these display screens and displaying a display area 29d displaying inputted (control) data, alphabetical keys 29e and numeral keys 29f for designating input data as well as an "OK" key 29g for commanding an input completion command (Step A53).

Then, when an operator presses the alphabetical keys 29e and the numeral keys 29f for designating a robot operation program or parameters and inputs control data codes such as a program code and a parameter code, the codes are displayed on the display area 29d and when the operator confirms it and presses the "OK" key, a selection command for selecting control data displayed on the display area 29d is transmitted to the controller 10 via the communication port 24 and the cable 35 and the window screen which has been displayed for inputting (control) data is erased (Step A54). Further, the operation sets a pointer to "0" (Step A55).

Figure 7:
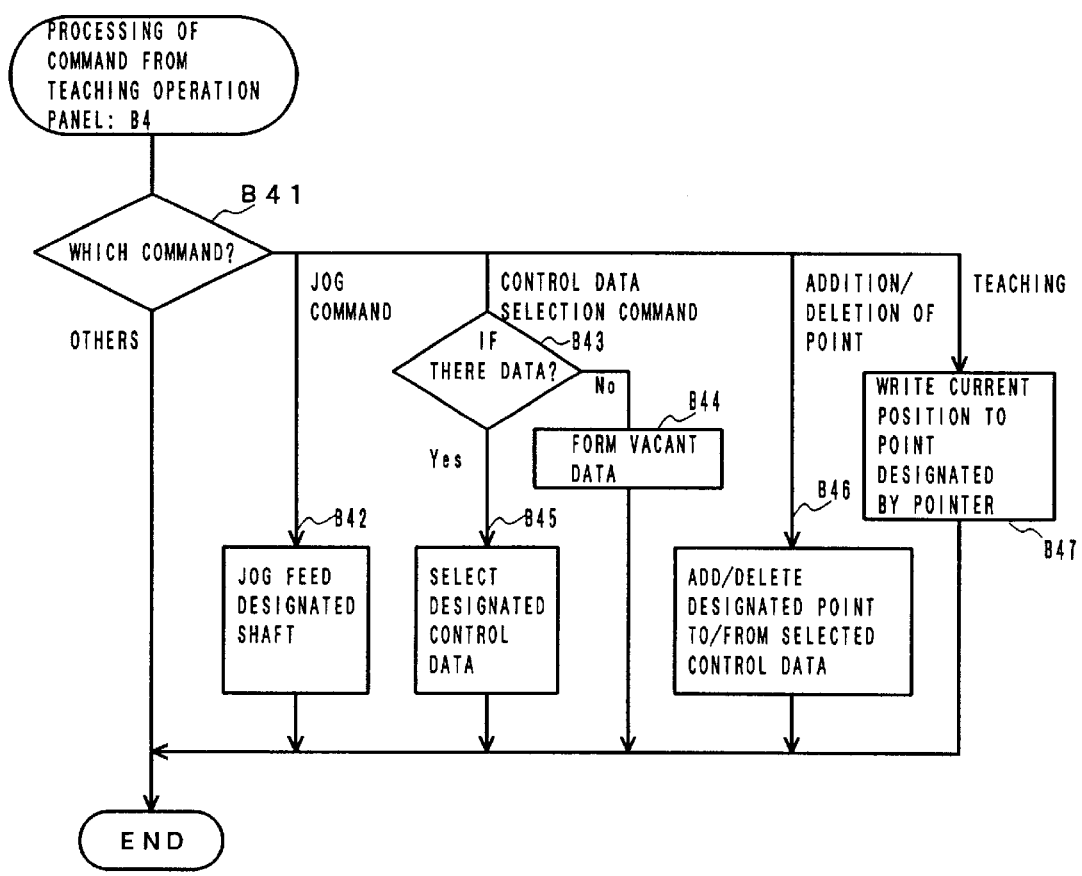
FIG. 7 is a flowchart of a command processing from a teaching operation panel according to the first embodiment.

Meanwhile, when the processor 11 of the robot controller 10 receives the control data selection command via the communication controller 15 (Step B1), the processor 11 receives it as the command from the teaching operation panel and starts the processing (Step B4) for commands from the teaching operation panel shown in FIG. 7 as a subroutine. In the case of the first embodiment, a command of jog feed, a command of selecting control data of an operation program, addition of teaching points or deletion of taught points as well as a command of storing the position and posture of the robot when the teaching points are added, are transmitted from the teaching operation panel 20 and the processor 11 determines transmitted data (Step B41) and when the control data selection command is transmitted in the above-described example, the processor 11 determines whether the control data is stored in RAM 13 (Step B43). If the control data of an operation program is formed and stored in RAM 13, the processor 11 transmits the control data to the teaching operation panel 20 (Step B45). Meanwhile, when there is no such control data and the control data is newly formed, only the code of the transmitted control data is stored in RAM and initially stored as vacant data (Step B44).

The processor of the teaching operation panel 20 carries out a graphic display processing based on the transmitted control data (Step A56). According to the graphic display processing, in a processing shown by FIG. 8, firstly, the operation reads an initial point transmitted from the robot controller 10 (Step A561) and determines whether there is data at the point (Step A562) and when there is data, the operation converts a three-dimensional position of x, y, z of the point into two-dimensional coordinates (u, v) to display it on the liquid crystal display device 29 and plots and displays it at a position of converted coordinates in the graphic display area 29b of the liquid crystal display device 29 as the taught point (Steps A563, A564). Further, when there is a point just in front thereof, the just front point and the point plotted currently are connected by a straight line (Step A565). Next, the operation reads a transmitted succeeding point (Step A566) and returns to Step A562. In the following, processings at Step A562 and later Steps are repeatedly executed, the graphic processing is finished when there is no data of points read at the Step A562, further, the touch panel processing is also finished and the operation returns to Step A2 of the main processing.

In this way, the taught points of the control data is graphically displayed on the graphic display area 29b of the liquid crystal display device 29 as shown by FIG. 12. Further, in respect of a point designated by the pointer, a point on the graphic display is displayed as a point which is currently being selected by a cursor or winking display.

Figure 8:
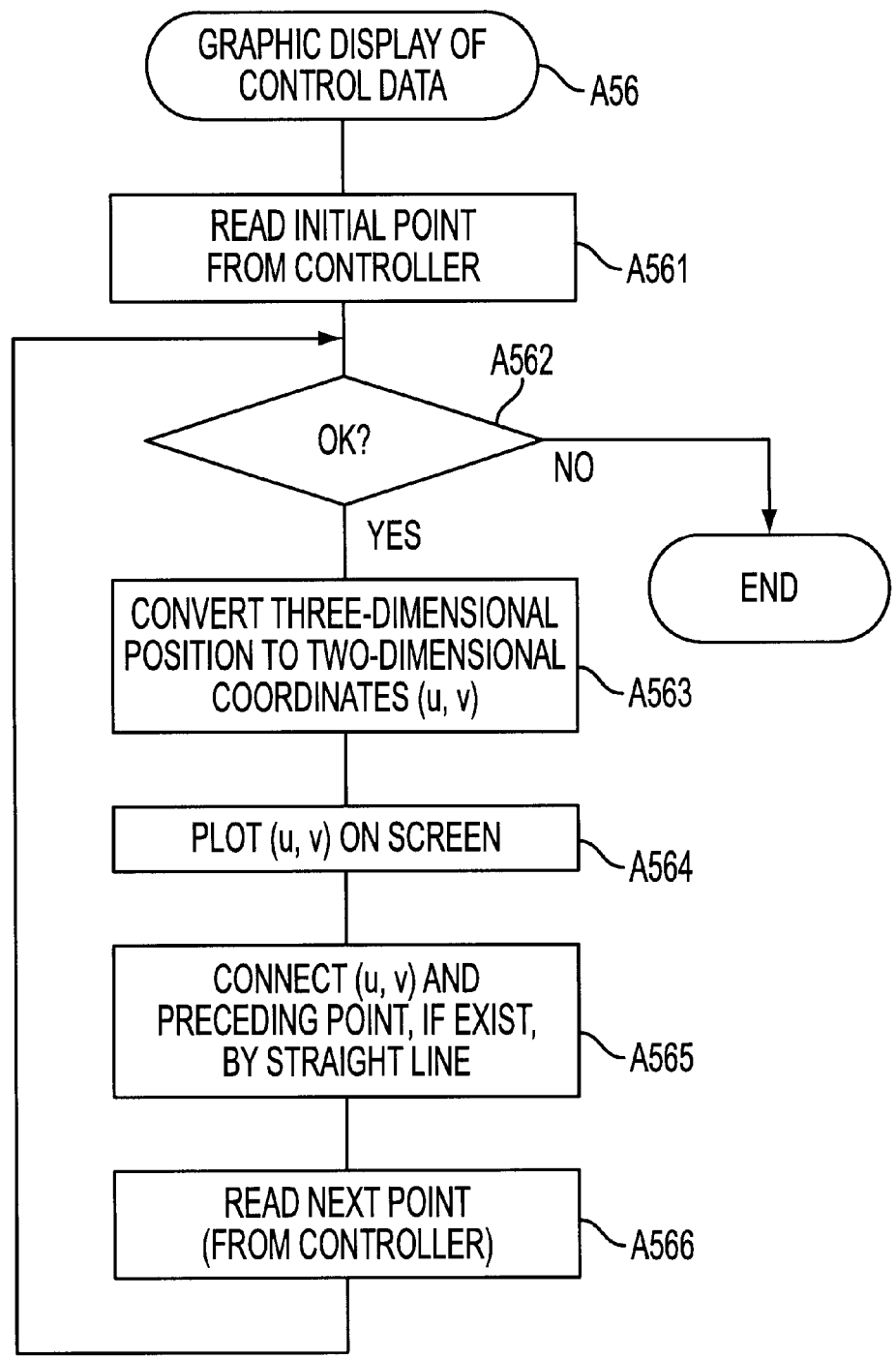
FIG. 8 is a flowchart of a graphic display processing of control data according to the first embodiment.

Further, when there is no taught control data in RAM 13, that is, control data is to be newly created, in the above-described processings at Steps A561 and A562, there is no data of the initial point and accordingly, the graphic display processing of the control data shown by FIG. 8 is immediately finished and nothing is displayed initially on the graphic display area 29b of the liquid crystal display device 29.

When the control data selected in this way is displayed in graphic display (no display in the case of newly forming control data) and respective buttons of "position teaching", "deletion of point", "addition of point", "preceding point" "succeeding point" and "finish" of the button display area 29a of the liquid crystal display device 29, are validated and thereafter, the control data displayed in the graphic display is to be edited, in the case of deleting or adding teaching points, buttons of "preceding point" and "succeeding point" are operated and points which are being selected currently are changed. That is, the pointer is decremented by "1" at each time of pressing the button "preceding point" and the pointer is incremented by "1" at each time of pressing the button "following point" to thereby change the value of the pointer and the points which are being selected currently by a cursor or winking are changed in compliance with the value of the pointer (Step A61).

Further, when the taught point is to be deleted, the point to be deleted is set to the point which is being selected currently and the button "point deletion" is pressed. When the processor 21 detects that the button has been pressed at Step A51, the processor 21 transmits a command of deleting the taught point designated by the value of the pointer to the robot controller 10 (Step A57), deletes a corresponding taught point at the graphic display area 29b of the liquid crystal display device 29 and rewrites the graphic display (Step A56).

Further, when the teaching point is to be added, as described above, the buttons "preceding point" and "succeeding point" are operated, while changing the value of the pointer, a point in front of a point to be added by one is selected and the button "point addition" is pressed. When the processor 21 detects that the button "point addition" has been pressed from the touch panel (Step A51), the operation transmits a command of adding a teaching point successive to the current value of the pointer to the robot controller 10 and increments the pointer by "1" (Steps A58, A59).

When the processor 11 of the robot controller 10 receives a command of deleting the taught point designated by the pointer as mentioned above from the teaching operation panel 20 or a command of adding a teaching point successive to the taught point designated by the pointer (Steps B1, B4, B41), the processor 11 deletes the designated taught point in the control data stored to RAM 13 or provides a new taught point next to the taught point designated by the value of the pointer (Step B46).

When the teaching point is to be added, after pressing the button "point addition" or before pressing it, the operator operates the jog key 31 to move the robot 40 to a point intended to teach (Steps A3, A6, A61). When the jog key 31 is operated in this way, the processor 11 of the robot controller 10 detects the command from the jog key 31 at Step B41 and outputs to the servo control circuit 14 a jog feed command in correspondence with the jog feed command (motion command in +, −direction of joint angle, motion command in +, −direction of X, Y, Z axes) in correspondence with the operated jog key to thereby drive respective shafts of the robot 40 (Step B42).

When the robot 40 is brought into a position and a posture to be taught in this way, the operator presses the button "position teaching" of the touch panel 27. When the processor 21 of the teaching operation panel 20 detects that the button "position teaching" has been pressed (Steps A4, A51), the processor 21 outputs a command of rewriting and updating the point where the pointer is currently disposed to the current position of the robot in the taught data stored in RAM 13 (Step A60). Further, the operation changes the graphic display based on the rewritten taught point (Step A56).

When the command of rewriting the taught point is transmitted, the processor 11 of the robot controller 10 detects this (Steps B1, B41) and writes to update data of the current position and posture of the robot to a point designated by the pointer (newly formed point in the case of addition) (Step B47).

Further, in the case in which a teaching point is not newly added but position and posture of a point which has already been taught is changed, when the buttons "preceding point" and "succeeding point" are operated (Step A61), a taught point to be changed is selected and the robot 40 is positioned to the taught position by jog feed as mentioned above and the button "position teaching" is pressed, a taught point selected by the processing at Step B47 is newly stored with new position and posture.

Although according to the above-described explanation, a description has been given of an example of a case in which the control data is stored to RAM 13 of the robot controller 10 and the stored taught data is edited and modified, substantially similar processings are carried out even when the control data is newly formed.

That is, when a code of control data inputted at Step A53 is transmitted to the robot controller 10 and control data in correspondence with the code is not stored in RAM 13 (Step B43), vacant data is formed in RAM 13 (Step B44). Further, in the graphic display at Step A56, nothing is displayed since data is vacant. Further, the robot is moved by the jog feed (Step B42) and positioned to a point intended to teach, a command of teaching is outputted by pressing the button "position teaching" (Step A60). The current position and posture of the robot is stored as a taught point designated by a value of the pointer (Step B47). Further, the button "succeeding point" is pressed, the pointer is incremented by "1", the robot is moved and positioned to a successive point of teaching by jog feeding, the button "position teaching" is pressed and the position and posture of the robot is stored as a taught point. By carrying out successively the operation, control data of new operation program can be formed.

When the control data is edited, modified and newly formed in this way and the operation is finished, the button "finish" of the touch panel is pressed. When it is detected that the button "finish" has been pressed at Steps A4 and A51, the processor 21 of the teaching operation panel switches button display of the liquid crystal display device and switches the display to a display for validating only the button "editing" and invalidating other buttons (Step A62). Thereby, it is prevented that "position teaching" is erroneously pressed and control data is erroneously changed.

(Second Embodiment)

According to the second embodiment, a capacity of DRAM 23 of the teaching operation panel 20 is made large and the DRAM 23 can store control data intended to modify or edit or control data intended to newly form.

Therefore, the second embodiment differs from the first embodiment in that control data needs not to be modified, edited or created in RAM 13 of the robot controller 10 but can be carried out in DRAM 23 of the teaching operation panel 20. As a result, control data can be modified, edited or created only by the teaching operation panel 20.

The difference in processing in the first embodiment and that in the second embodiment resides in the touch panel processing at Step A5 in FIG. 2, processing of commands from the teaching operation panel at Step B4 in FIG. 3 and the graphic processing of control data at Step A56 (Step a56 in correspondence with the processing).

When power is inputted, the processor 21 of the teaching operation panel 20 starts processing shown by FIG. 2 and initializes the screen of the liquid crystal display device 29 similar to the first embodiment (Step A1). Although this point is the same as that of the first embodiment, according to the second embodiment, control data of a robot operation program can be modified, edited and formed regardless of whether the teaching operation panel 20 is connected or not connected to the robot controller 10 and accordingly, a selection of whether the modifying, editing and forming operation is carried out on line in which the teaching operation panel 20 is connected to the robot controller 10 or is carried out in off line in which it is not connected thereto, can be carried out. Buttons "on line" and "off line" as mode selecting buttons there for are installed on the touch panel 27 as shown by FIG. 12. Further, the buttons "on line" and "off line" are always validated and in the initial screen, these buttons also display validated states along with the button "editing".

Further, the processor 21 monitors whether the status information is transmitted, whether the jog key 31 is operated and whether the touch panel 27 is operated and when the status information is transmitted, the processor 21 carried out the processing of the status information (Step A7 (FIG. 4)) and when the jog key 31 is operated, the processor 21 carries out the jog key processing (Step A6 (FIG. 5)). These processings are the same as those in the first embodiment. Further, when off line is selected and the teaching operation panel 20 is not connected to the robot controller 10, the status information is not transmitted and accordingly, the status information processing is not carried out at all. Further, even when the jog key is operated, the information is not transmitted to the robot controller 10 and a meaningless jog key operation is constituted.

Figure 9:
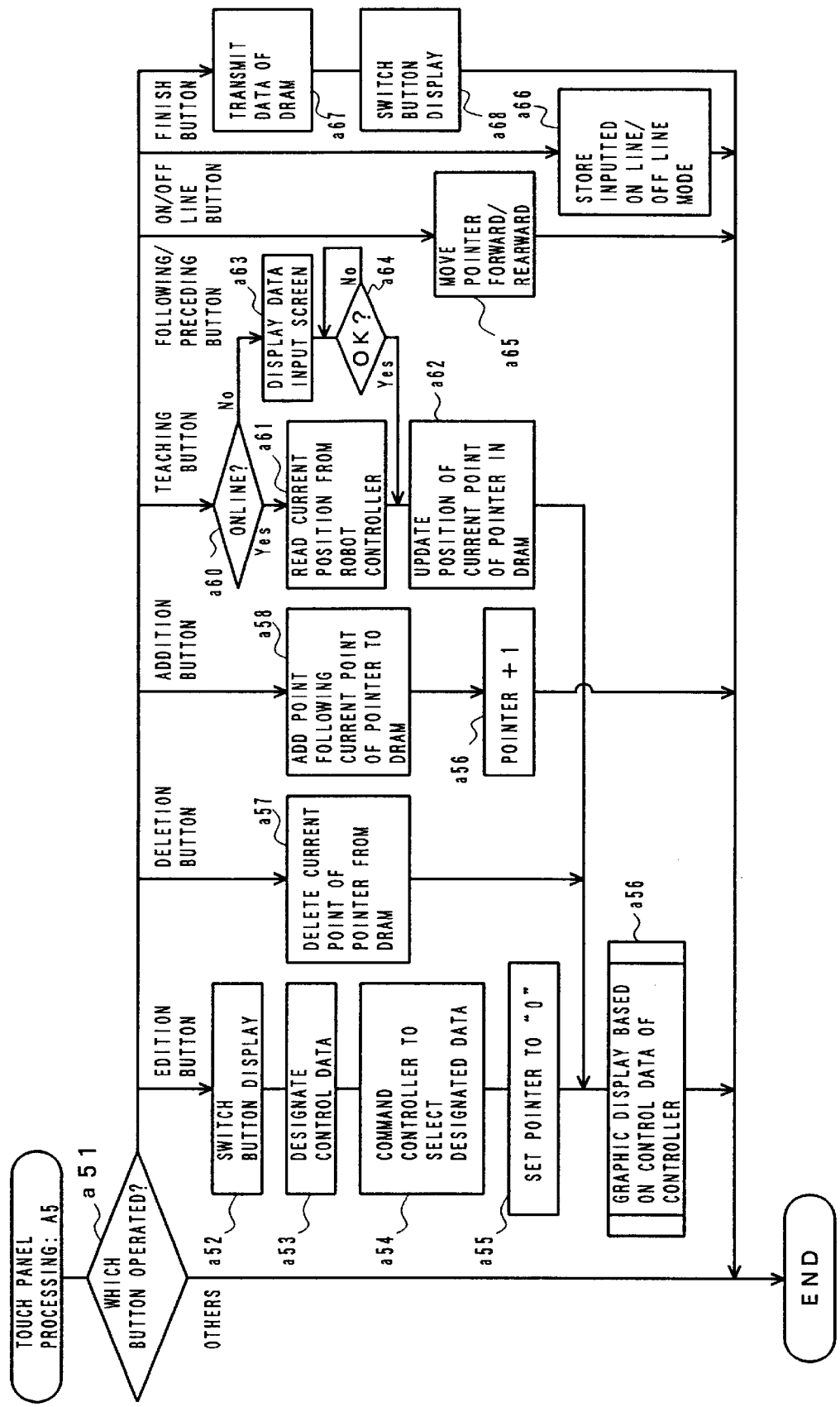
FIG. 9 is a flowchart of a touch panel processing according to a second embodiment.

Meanwhile, in respect of the touch panel processing (Step A5), the second embodiment differs from the first embodiment. FIG. 9 is a flowchart showing a touch panel processing according to the second embodiment.

First, a selection of whether the editing processing is carried out off line or carried out on line is made initially and when the button "off line" or the button "on line" of the touch panel 27 is pressed, the pressed mode is stored (Step a66).

When the button "editing" is pressed, similar to the first embodiment, button display is switched, the "editing" button is invalidated and other buttons which have been invalidated are validated (Step a52). Further, similar to the first embodiment, code input of control data is urged and the input is awaited (Step a53), when the control data is inputted, data of the control data code is read from RAM 13 of the robot controller 10 and is stored to DRAM 23. Further, when the teaching operation panel 20 is not connected to the robot controller 10 in off line mode, designated control data is not read, as a result, control data is newly formed. Further, in this case, when a memory card is read via PCMCIA 25 and data of the designated control data code is present in the memory card, the data may be copied to DRAM 23.

Figure 11:
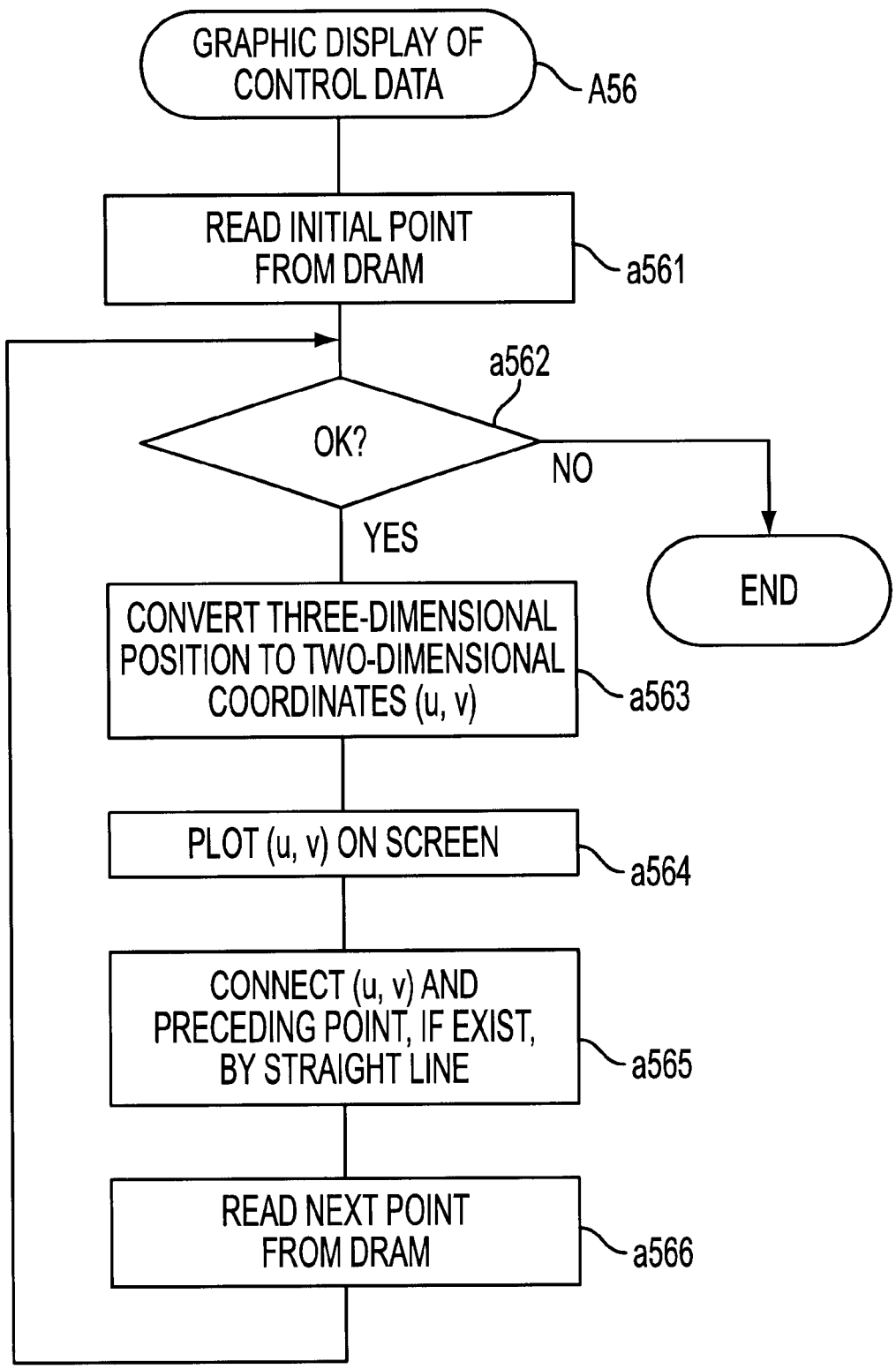
FIG. 11 is a flowchart of a graphic display processing of control data according to the second embodiment.

Next, the processor 21 sets the pointer to "0" and carries out graphic display based on a control data read to DRAM 23 (Step a56). The graphic display processing is a processing shown by FIG. 11 and as is known by comparing FIG. 11 with FIG. 8 indicating the graphic processing according to the first embodiment, a point of difference resides in that data is read from RAM 13 of the robot controller 10 or DRAM 23 of the teaching operation panel 20 and accordingly, an explanation of the processing operation will be omitted.

Further, when the buttons "point deletion" and "point addition" are pressed, different from the first embodiment shown by FIG. 8, according to the second embodiment, a command of deleting a point and a command of adding a point are not transmitted to the robot controller 10 but the point is added from the control data stored to DRAM 23 or added thereto (Steps a57, a58).

When the button "position teaching" is pressed, the processor 21 determines whether the operation is in on line mode or in off line mode (Step a60), and when the operation is in on line mode, the processor 21 reads current position and posture of the robot from the robot controller 10 (Step a61) and stores the data as a teaching position in respect of a point where the pointer currently disposes in DRAM 23 (Step a62). Further, in the case of off line mode, the processor 21 cannot read and teach the position and posture of the robot and accordingly, the processor 21 displays the window screen shown by FIG. 13 on the liquid crystal display device 29 and awaits for input of teaching data (Step a63). When the operator inputs the teaching data by using the alphabetical keys or the numeral keys and presses the OK key (Step a64), the processor 21 writes the inputted data at the position where the pointer is currently disposed (Step a62) and further, the graphic display is rewritten based on the written data (Step a56).

Further, a processing in which the buttons "preceding point" and "succeeding point" are pressed (Step a65) is the same as that in the first embodiment and accordingly, an explanation thereof will be omitted.

Finally, when the processings of modifying, editing and forming the control data have been finished and the button "finish" is pressed, the control data stored to DRAM 23 is transmitted to the robot controller 10 in the case of on line mode and the memory card via the PCMCIA interface in the case of off line mode (Step a67). Further, similar to the first embodiment, the button display is switched, the button "editing" is validated and other buttons are invalidated (incidentally, buttons designating modes of on line and off line are validated).

Further, although according to the second embodiment, in respect of the processing which is carried out by the processor 11 of the robot controller 10, also the processing shown by FIG. 3 similar to the first embodiment is carried out, in this case, the processing of commands from the teaching operation panel at Step B4 differs from that of the first embodiment.

Figure 10:
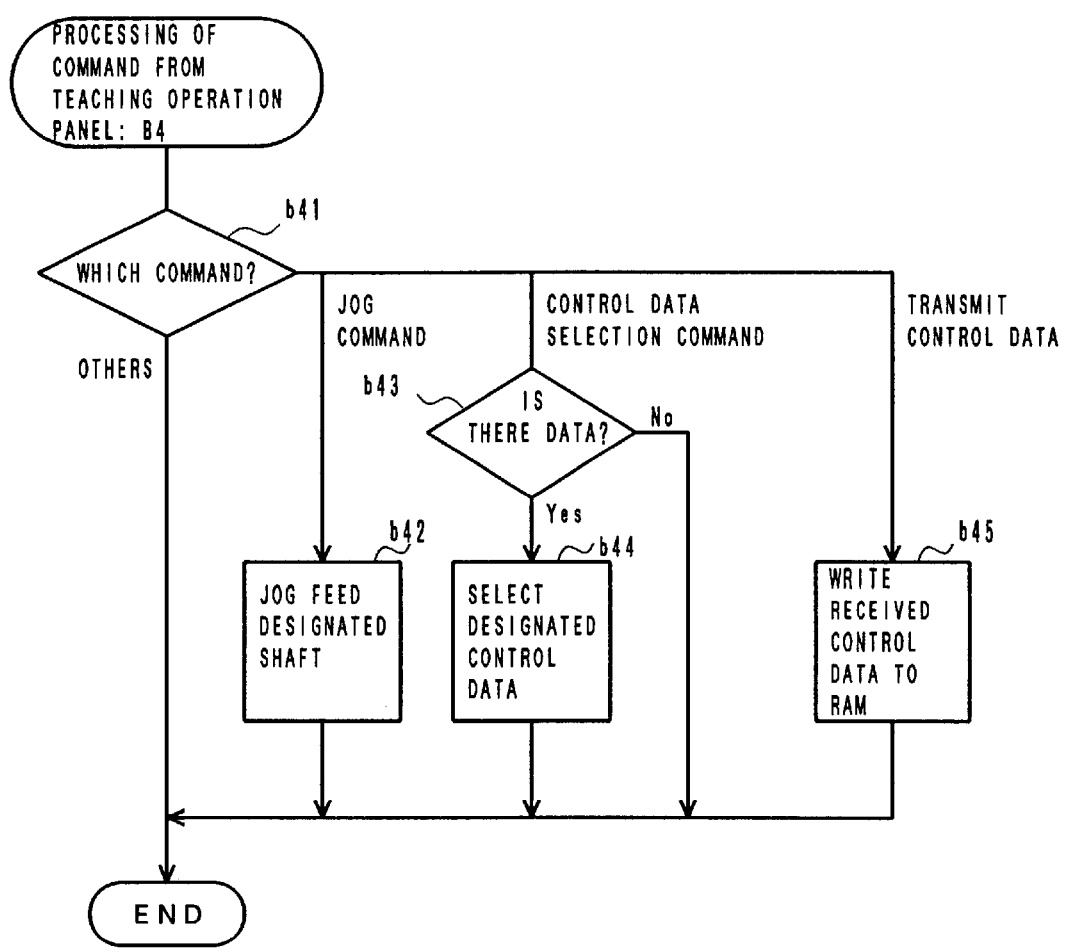
FIG. 10 is a flowchart of a command processing from a teaching operation panel according to the second embodiment.

The processing of commands from the teaching operation panel according to the second embodiment is a processing shown by FIG. 10 and is the same as that of the first embodiment in that jog feed of the designated jog feed shaft is carried out (Step b42) and the robot is moved to a position intended to teach by the jog feed.

Next, when a command of selecting control data is inputted in a processing at Step a54, it is determined whether the taught control data is present in RAM 13 (Step b43), when it is not present, the processing is finished without transmitting any data, further, when it is present, the control data is transmitted to the teaching operation panel 20 (Step b44). Further, when the processings of modifying, editing and creating teaching data have been finished and the control data is transmitted by a processing at Step a63, the processor 11 of the robot controller 10 stores the transmitted control data to RAM 13 (Step b45). Thereafter, the robot is operated based on stored taught data.

As has been described, according to the teaching operation panel of the robot control apparatus of the invention, control data of a teaching operation program can be displayed in diagrams or graphics by the teaching operation panel per se, the control data can be expressed visually and sensitively and formation and modification of the control data is facilitated. Further, the robot controller and the teaching operation panel are connected by a cable and connectors and accordingly, the teaching operation panel according to the invention can be used in place of the teaching operation panel in the conventional robot control apparatus. When a new operation program is taught to the robot, the teaching operation panel of the present invention capable of carrying out graphic display may be used such that it is connected to the robot control apparatus to thereby teach the operation program and after the teaching has been finished, the conventional teaching operation panel which cannot carry out graphic display is reconnected and maintenance control is carried out.

Further, the teaching operation panel according to the invention can create and edit control data of a robot operation program only by the teaching operation panel (without being connected to the robot controller) and accordingly, it can be used in place of a conventional automatic programming apparatus of off line teaching. Further, the teaching operation panel is provided with the PCMCIA interface and can be connected with an outside memory of a memory card and accordingly, control data can be loaded from the outside memory or control data can be downloaded to the outside memory.

Further, by providing the teaching operation panel with a function of graphic display comparable to that of a personal computer, the teaching operation panel can transmit screen and operation of a personal computer between the teaching operation panel and the personal computer separately installed via communication and the operation which is carried out in the separately installed personal computer can be carried out in the teaching operation panel.

According to the invention, display of diagrams and graphics comparable to those of a personal computer can be carried out by the display device of the teaching operation panel without installing a separate personal computer and accordingly, content of control data can be grasped easily and clearly by displaying control data of a robot operation program by visual diagrams or graphics.

What is claimed is:

1. A robot control apparatus, comprising:
    a robot controller; and
    a portable teaching operation panel communicating with said robot controller, the portable teaching operation panel comprising a display device, a data input device, a microprocessor, a semiconductor memory and an operating system stored in and operable on said semiconductor memory,
    wherein said microprocessor is controlled by the operating system to generate a graphic display on said display device based on data input through said data input device.

2. A robot control apparatus according to claim 1, wherein the operating system comprises a creating/editing program for creating or editing robot control data.

3. A robot control apparatus according to claim 2, wherein said portable teaching operation panel further comprises a control data storage memory storing the robot control data created or edited by said creating/editing program.

4. A robot control apparatus according to claim 3, wherein said portable teaching operation panel further comprises an external memory, and said control data storage memory and said external memory are connected with each other to input and output data through data interface.

5. A robot control apparatus according to claim 3, wherein the robot control data is sent and received between said control data storage memory and said robot controller.

6. A robot control apparatus according to claim 2, wherein said microprocessor generates a graphic display on said display device based on the robot control data created or edited by said creating/editing program.

7. A robot control apparatus according to claim 2, wherein said microprocessor creates or edits the robot control data, and said portable teaching operation panel communicates the robot control data to said robot controller.

* * * * *